United States Patent

Judkins et al.

[11] Patent Number: 5,972,077
[45] Date of Patent: Oct. 26, 1999

[54] GAS SEPARATION DEVICE BASED ON ELECTRICAL SWING ADSORPTION

[75] Inventors: Roddie R. Judkins, Knoxville; Timothy D. Burchell, Oak Ridge, both of Tenn.

[73] Assignee: Lockheed Martin Energy Research Corporation, Oak Ridge, Tenn.

[21] Appl. No.: 09/084,256

[22] Filed: Feb. 20, 1998

Related U.S. Application Data

[63] Continuation-in-part of application No. 08/601,672, Feb. 15, 1996, abandoned, and a continuation-in-part of application No. 08/747,109, Nov. 8, 1996.

[51] Int. Cl.$^6$ ............................................. B01D 53/04
[52] U.S. Cl. .......................... 95/136; 95/139; 95/148; 96/143; 96/146
[58] Field of Search ................. 95/90, 114–116, 95/136, 139, 148; 96/108, 121, 126–130, 143, 146

[56] References Cited

U.S. PATENT DOCUMENTS

| | | | |
|---|---|---|---|
| 3,608,273 | 9/1971 | Fabuss et al. | 95/148 |
| 3,727,375 | 4/1973 | Wallace | 95/139 X |
| 3,768,232 | 10/1973 | Farber et al. | 96/146 X |
| 4,028,069 | 6/1977 | Nolley, Jr. et al. | 95/139 X |
| 4,038,050 | 7/1977 | Lowther | 96/146 X |
| 4,094,652 | 6/1978 | Lowther . | |
| 4,101,296 | 7/1978 | Lowther | 95/148 X |
| 4,312,641 | 1/1982 | Verrando et al. | 96/126 X |
| 4,322,394 | 3/1982 | Mezey et al. | 95/148 X |
| 4,401,763 | 8/1983 | Itoh . | |
| 4,560,393 | 12/1985 | Way . | |
| 4,685,940 | 8/1987 | Soffer et al. . | |
| 4,734,394 | 3/1988 | Kosaka et al. . | |
| 4,737,164 | 4/1988 | Sarkkinen | 95/148 X |
| 4,775,484 | 10/1988 | Schmidt et al. . | |
| 4,790,859 | 12/1988 | Marumo et al. | 95/139 X |
| 4,810,266 | 3/1989 | Zinnen et al. . | |
| 5,081,097 | 1/1992 | Sharma et al. . | |
| 5,091,164 | 2/1992 | Takabatake . | |
| 5,143,889 | 9/1992 | Takahiro et al. . | |

(List continued on next page.)

FOREIGN PATENT DOCUMENTS

| | | | |
|---|---|---|---|
| 2659869 | 9/1991 | France | 95/148 |
| 3129848 | 2/1982 | Germany | 95/114 |
| 3515207 | 10/1985 | Germany | 95/139 |
| 55-003871 | 1/1980 | Japan | 95/136 |
| 5-068845 | 3/1993 | Japan | 95/148 |
| 0865353 | 9/1981 | U.S.S.R. | 95/139 |
| 0931215 | 5/1982 | U.S.S.R. | 96/127 |

OTHER PUBLICATIONS

Judkins, R. R., "Neat Fibers," *Lab Notes,* Apr., 1996, pp. 1–2, No. 65, Oak Ridge National Lab, USA.

Jasra, R. V., et al, "Separation of Gases by Pressure Swing Adsorption," *Separation Science and Technology,* 26, pp. 885–930 (1991).

Kaneko, K. et al "Microporosity and Adsorption Characteristics Against NO, $SO_2$ and $NH_3$ of Pitch–Based Activated Carbon Fibers" *Carbon* 26, pp. 327–332 (1988).

Burchell, T. D. et al "The Effect of Neutron Irradiation on the Structure and Properties of Carbon–Carbon Composite Materials," Effects of Radiation on Materials: 16th Intl. Sym., ASTM STP 1175, Am. Soc. for Testing of Materials, Philadelphia, (1993).

Wei, G. C. et al "Carbon–Bonded Carbon Fiber Insulation for Radioisotope Space Power Systems," *Ceramic Bulletin,* 64 pp. 691–699 (1985).

*Primary Examiner*—Robert H. Spitzer
*Attorney, Agent, or Firm*—Jones & Askew, LLP

[57] ABSTRACT

A method and apparatus for separating one constituent, especially carbon dioxide, from a fluid mixture, such as natural gas. The fluid mixture flows through an adsorbent member having an affinity for molecules of the one constituent, the molecules being adsorbed on the adsorbent member. A voltage is applied to the adsorbent member, the voltage imparting a current flow which causes the molecules of the one constituent to be desorbed from the adsorbent member.

11 Claims, 1 Drawing Sheet

U.S. PATENT DOCUMENTS

| | | | |
|---|---|---|---|
| 5,282,886 | 2/1994 | Kobayashi et al. | 95/148 X |
| 5,308,457 | 5/1994 | Dalla Betta et al. | 95/148 X |
| 5,369,214 | 11/1994 | Farcasiu et al. | |
| 5,389,125 | 2/1995 | Thayer et al. | 96/146 X |
| 5,411,577 | 5/1995 | Moreau et al. | |
| 5,446,005 | 8/1995 | Endo. | |
| 5,482,538 | 1/1996 | Becker et al. | 95/148 X |
| 5,505,825 | 4/1996 | Gold et al. | 95/148 X |

GAS SEPARATION DEVICE BASED ON ELECTRICAL SWING ADSORPTION

CROSS-REFERENCE TO RELATED APPLICATIONS

This application is a continuation-in-part of two earlier filed U.S. applications; first being U.S. patent application Ser. No. 08/601,672, filed on Feb. 15, 1996, now abandoned, and second being U.S. patent application Ser. No. 08/747,109, filed Nov. 8, 1996 entitled Activated Carbon Fiber Composite Material and Method of Making, the entirety of which are herein incorporated by reference.

This invention was made with Government support under contract DE-AC05-84OR21400 to Martin Marietta Energy Systems, Inc. and the Government has certain rights in this invention.

FIELD OF THE INVENTION

The present invention relates to devices and methods for separating gases, and more specifically, to a gas separation method and apparatus which uses a carbon fiber composite molecular sieve. The sieve is specially activated for high selectivity of target gases such as $CO_2$ and/or $H_2S$. Subsequent desorption is achieved by passing an electrical current through the sieve to thereby generate heat and/or otherwise excite the adsorbed molecules.

BACKGROUND OF THE INVENTION

Natural gas is the cleanest burning of fossil fuels both with respect to emission of acid gases such as sulfur dioxide and carbon dioxide. For example, compared to coal, burning of natural gas results in the emission of only 60–70% of the $CO_2$ emissions of a coal burning system.

For the past several years, the perceived abundance of natural gas, advances in gas turbine technology, and many other factors have resulted in significant increases in the use of natural gas for power generation. However, considerable quantities of sub-quality natural gas exist in the United States, and this must be upgraded prior to use. Carbon dioxide is an impurity that creates operational, economic, and environmental problems. It is a diluent without any fuel value, and is an environmental concern as it is one of the greenhouse gases. It is an acid gas and can cause corrosion problems in the presence of water, creating carbonic acid that is quite corrosive to some alloys.

Several $CO_2$ separation and capture technologies have potential for purification of natural gas. These include amine scrubbing, molecular sieves, cryogenic removal, and membrane separation. Molecular sieves, such as zeolites and activated carbon, are used in pressure swing adsorption (PSA) or temperature swing adsorption systems which separate gas mixtures by selective adsorption of one or more of the gases at high pressure and/or low temperature thus producing a pure product stream. The captured gas is then desorbed by lowering the pressure, or increasing the temperature, of the adsorbent system (thus the system "swings" from a high to low pressure or a low to high temperature).

Carbon fiber sieves are generally known for use in the separation of gases. One such use is described in U.S. Pat. No. 4,734,394 to Kosaka et al., wherein the activated carbon fiber sieve is used to separate nitrogen from air.

U.S. Pat. No. 4,685,940 to Soffer et al. describes a separation device in which carbon membranes have a very narrow range of pore sizes. The membranes are formed by pyrolizing a sheet of regenerated cellulose.

U.S. Pat. No. 5,081,097 to Sharma et al. describes a copper modified carbon molecular sieve for selective oxygen removal.

U.S. Pat. No. 5,411,577 to Moreau et al. describes a method of separating gases using a particulate composite material with a carbon matrix.

U.S. Pat. No. 4,810,266 to Zinnen et al. describes a method of separating carbon dioxide using a carbon molecular sieve. A gas to be treated is contacted with the sieve at room temperature and atmospheric pressure, with adsorbing gas being released by heating to a moderate temperature. The sieve is contacted with a dihydric alcohol amine compound, to thereby impart an amine functionality to the material.

U.S. Pat. No. 4,560,393 to Way describes a method of enriching nitrogen using a pressure swing adsorption system. Electrically negatively charged oxygen is attracted to a positively charged molecular sieve coke material.

U.S. Pat. Nos. 4,094,652 and 4,038,050 to Lowther describe an electrodesorption system for regenerating a dielectric adsorbent bed. A high voltage electric field is applied to zeolite particles that form the molecular sieve bed. Lowther shows that sieve resistivity increases (conductivity decreases) as moisture content decreases. The conductivity of Lowther's bed material is dependent upon its absorbed water content. Lowther's method has been shown useful only for removing water from a gas stream. However, Lowther does not suggest that his method can be used with any other bed material.

U.S. Pat. No. 3,768,232 to Farber describes a solvent recovery method and system including an absorbent bed, a vacuum distillation means, a means for reducing the atmospheric pressure on the bed, a means for heating the bed, a means for condensing the distilled solvent vapor, and a means for collecting the distilled solvent. Farber also describes a plurality of heating elements, such as electrical resistance heating rods containing fins, that are disposed within the porous bed of adsorbent. Farber describes only thermally heating the bed to a temperature at or above the boiling temperature thus distilling solvent from the bed. The present invention describes desorption of gases from their bed using surface physidesorption and ohmic heating, whereas Farber teaches distilling liquids from his bed.

U.S. Pat. No. 5,308,457 to Dalla Betta describes a volatile organic control device comprising an adsorber adapted to adsorb volatile organics from a gas stream passing therethrough and an oxidation catalyst adapted to oxidize the volatile organics desorbed from the adsorber. The present invention uses an electrical current that passes directly through the filter medium, and that both electrically and thermally desorbs sorbed gases. Dalla Betta describes passing an electrical current through a first electrically conductive support for heating, and further describes oxidizing the hydrocarbon by contacting it with a second support having an oxidation catalyst. The present invention desorbs gases from the bed and Dalla Betta oxidizes the hydrocarbons by contact with a catalyst.

U.S. Pat. No. 4,737,164 to Sarkkinen describes a process for recovering volatile impurities from gas which comprises passing the gas through a layer of fibrous activated carbon acting as an adsorbent for impurities while applying an electric voltage across the fibrous layer to improve its adsorption capacity and thereafter desorbing impurities from the layer of fibrous activated carbon. The present invention uses electrical current to desorb pollutants from the filter medium and Sarkkinen uses the electrical current to improve the adsorption capacity of his fibrous activated carbon.

U.S. Pat. No. 5,446,005 to Endo describes an optically isotropic pitch based activated carbon fiber. The present invention describes a carbon fiber composite material consisting essentially of a multiplicity of porous carbon fibers bonded with a carbonizable organic binder.

U.S. Pat. No. 5,091,164 to Takabatake describes a porous carbon-carbon composite formed via a pressure molding process having a porosity of 25%–65%, which is well below the porosity range of 82%–86% described in the present invention.

Pressure swing and temperature swing adsorption are mature technologies and are economically favorable in some gas-gas separation, especially in smaller scale systems. However, a need exists for a more energy efficient desorption technique.

In spite of the above examples of existing separation technologies, a continuing need exists for techniques that are cost effective and relatively simple to operate.

SUMMARY OF THE INVENTION

An object of the present invention is to provide an efficient, reliable and effective apparatus and method for performing gas separations.

Another object of the present invention is to provide an apparatus and method for performing gas separations in which a molecular sieve is used as an adsorbent, and the separated gas is desorbed with relative ease and cost effectiveness.

Still another object of the present invention is to provide an apparatus and method for performing gas separations in which a carbon fiber composite molecular sieve is activated to be highly selective for particular gases, such as $CO_2$ and $H_2S$.

These and other objects are achieved by providing a method and apparatus for separating one or more selected constituents from a fluid mixture which includes flowing the fluid mixture through an adsorbent member having an affinity for molecules of the targeted constituents, the molecules being adsorbed on the adsorbent member, and applying a voltage to the adsorbent member, the voltage imparting a current flow which causes the molecules of the adsorbed constituents to be desorbed from the adsorbent member.

Other objects, advantages, and salient features of the invention will become apparent from the following detailed description, which taken in with the annexed drawings, discloses the preferred embodiment of the present invention.

DETAILED DESCRIPTION OF THE PREFERRED EMBODIMENT

Figure 1:
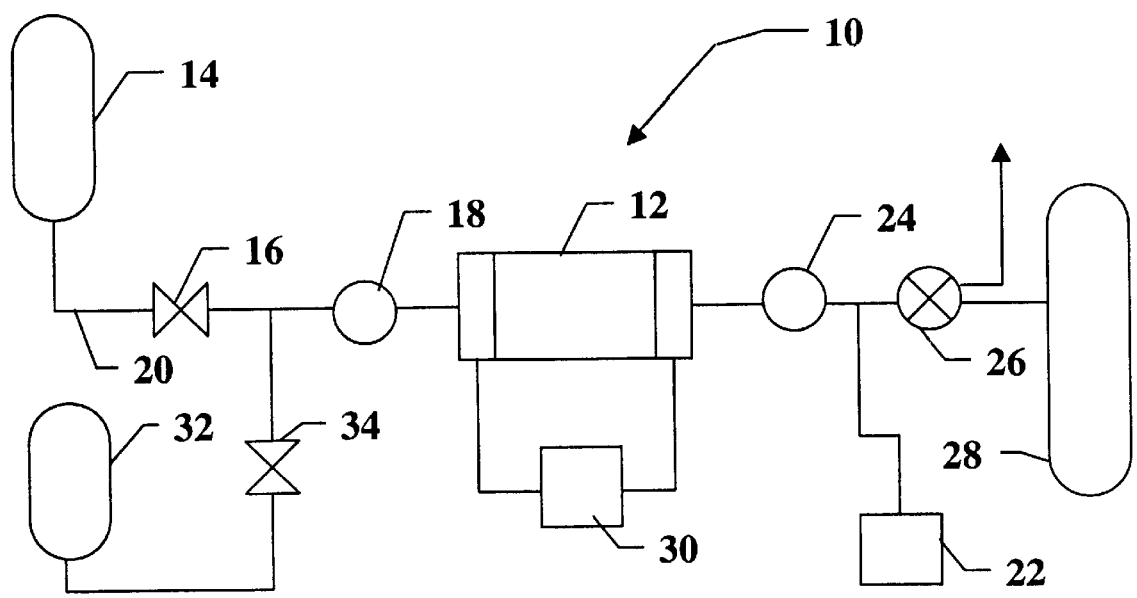
FIG. 1 is a schematic view of a system for carrying out a preferred method of the present invention.

Referring to FIG. 1, a system 10 for separating gases includes an adsorbent member 12 through which a fluid is caused to flow. The fluid contains a constituent for which the adsorbent member 12 has a high affinity. The adsorbent member is preferably a carbon fiber composite molecular sieve that has been activated for the particular constituent of interest. In a preferred application of the invention, the fluid is natural gas and the constituents are carbon dioxide and/or hydrogen sulfide that are contained in the natural gas.

A fluid source 14 is shown upstream of the adsorbent member 12, and can adopt any suitable form. The source may in fact be the well from which natural gas, for example, is collected in the field. A control valve 16 and flow meter 18 are shown in the line connecting the source 14 to the adsorbent member 12.

As fluid flows through the adsorbent member 12, molecules of the constituent targeted for separation are adsorbed in the member. When the member 12 is saturated, a desorbing technique is provided.

The adsorbent member 12, preferably a monolithic activated carbon material, has a high affinity, high capacity, and high uptake rate for adsorption of the gas in question, such as $CO_2$ or $H_2S$. This is particularly important in natural gas treatment because it is desirable to remove all the $CO_2$ and $H_2S$ but to minimize the adsorption of methane.

Desorption of the $CO_2$ from such an adsorbent with these characteristics would be difficult or energy intensive to achieve by standard techniques such as pressure and temperature swing processes. The desorption technique of the present invention, called electrical swing adsorption, is a low energy input process. The electrically enhanced desorption observed is highly energy efficient and suggests that the desorption mechanism is primarily a surface phenomenon that breaks the binding energy of physically adsorbed molecules, i.e. surface physidesorption. Experiments have confirmed that for molecular adsorption of carbon dioxide and similar gaseous compounds, the energy required for desorption is equal to the heat of desorption. Thus, bulk heating of the adsorbent via ohmic heating is not required, as is the case for adsorbents, such as zeolites, which are insulators.

Various techniques may be employed to determine when the adsorbent member 12 is saturated and in a condition for regeneration. In the illustrated embodiment, a monitor device 22 is disposed downstream of the adsorbent member 12 to analyze the content of the fluid stream. A second flow meter 24 may also be provided downstream of the adsorbent member 12. The monitor device 22 may be, for example, a mass spectrometer. Normally, the gas stream passes through a control valve 26 to a collection tank 28, with the separated constituent accumulating in the adsorbent member 12.

If the monitor determines that the adsorbent member is saturated, as evidenced by the presence of the separated constituent at the monitor device 22, a desorbing technique of the present invention will be employed. In this technique, the source 14 is at first isolated from the system by means of valve 16 in the interconnecting pipe 20. Then, an electric current is caused to flow through the adsorption member 12 by a power source 30 connected to the opposite ends of the member 12. Since the adsorbent member 12 is electrically conductive, the electric current provides surface physidesorption energy, ohmic heating and/or excitation of carbon dioxide molecules which are strongly adsorbed on the monolithic carbon fiber composite (assuming carbon dioxide is the target gas for separation). The electrical conductivity of the member 12 allows an electric current to be passed through the member 12. The electric resistance of the material results in surface physidesorption, ohmic heating or other modes of excitation of the fiber surfaces, which results in desorption of the carbon dioxide. When this occurs, valve 26 can be switched to vent, and isolate the collection tank 28, while a purge gas from a purge gas source 32 is caused to flow through the member 12 by means of valve 34.

Alternately, purging could occur by flowing a fraction of the product gas from the source 28 back through member 12 and collecting the adsorbed gas in tank 32.

The present invention also embodies the activation of the fibers of the member 12 to maximize the adsorption of a target gas, such as carbon dioxide or hydrogen sulfide. In other words, activation will be conducted to provide the optimum adsorption capacity for the target gases being separated.

While desorption is occurring, the source gas, such as natural gas, could be switched to another system, or another adsorption member within the same system, so that occur continuously.

Figure 2:
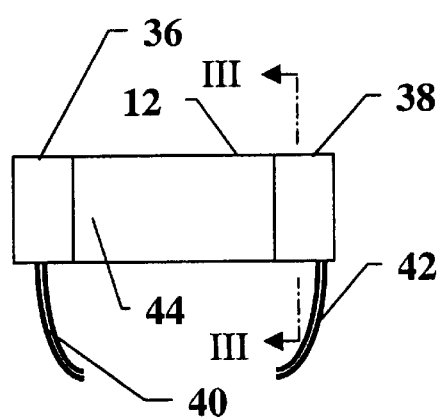
FIG. 2 is a side elevation view of a preferred carbon molecular sieve used in the system of FIG. 1.
Figure 3:
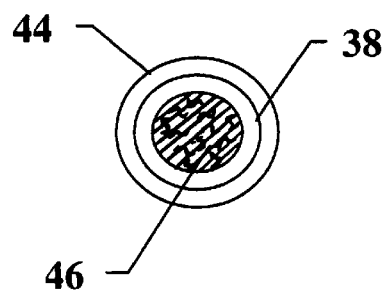
FIG. 3 is an enlarged, cross-sectional view taken along line III—III of FIG. 2.

In FIGS. 2 and 3, the adsorption member 12 is shown in greater detail. In particular, the carbon fiber material of the member 12 is formed in a generally cylindrical shape and the opposite ends are wrapped in a copper foil 36 and 38. These foils provide a means for connecting electrical leads 40 and 42 to the member 12. A shrink-wrap outer skin 44 is formed over the whole structure and provides two functions. First, the skin contains the gas as it flows through the member 12. Secondly, the skin holds the foils 36 and 38 in contact with the adsorbent material 46, and can also be used to hold pipe ends to the member 12. All experimental parameters and materials are non-limiting examples.

The power supply can be any conventional type, such as one that produces on a selective basis 0–20 Volts. The adsorption member 12 can be made from carbon fiber composite molecular sieve material manufactured at the Oak Ridge National Laboratory in Oak Ridge, Tenn. from isotropic pitch fibers available from Ashland Chemical Co. and available by the trade designation "P200" pitch fibers. Activation is performed, for carbon dioxide, at 850 degrees C. for 6–18 hours in saturated ($H^2$) helium. The BET surface area of the material, determined from nitrogen adsorption, ranges from 200 to 2,000 $m^2g$.

Desorption can be accomplished by setting the power supply at 1 volt and between 4–5 amps, although these numbers are non-limiting examples.

In experiments it was found that there is a direct relationship between the applied voltage and the rate of desorption. These results are expressed in the following Table:

| Cycle | Desorption Time (minutes) | Voltage | Current (amps) | Power (watts) |
|---|---|---|---|---|
| 1 | 13 | 1.0 | 4.45 | 4.45 |
| 2 | 20 | 0.5 | 2.187 | 1.085 |
| 3 | 20 | 0.5 | 2.18 | 1.094 |
| 4 | 30 | 0.1 | 0.43 | 0.043 |

The laboratory results were obtained using adsorption members measuring three inches in length and one inch in diameter. The passage of the electrical current there through resulted in heating of the carbon fiber experimental adsorption members to approximately 50 degrees C.

The present invention applies to any and all gas-gas, gas-liquid, and liquid-liquid separations utilizing an adsorbent. The invention can be applied to any of these systems in which the adsorbent is electrically conductive. The invention can be applied as an electrical swing adsorption technique, or it can be combined as an enhancement with pressure swing and/or temperature swing techniques.

Other uses of the invention include the separation of carbon dioxide from hydrogen gas streams resulting from natural gas reforming; removal of $CO_2$ from breathing air in confined spaces, for example in airplanes or submarines; hydrogen Sulfide removal from synthesis gas produced by the gasification of coal; carbon dioxide capture from fuel cell recycle gas; and carbon dioxide capture from steam plant combustion emissions.

While the preferred embodiment of the present invention has been shown and described, it will be understood that it is intended to cover all modifications and alternate methods falling within the spirit and scope of the invention as defined in the appended claims or their equivalents.

What is claimed is:

1. A method for separating one or more targeted constituents from a fluid mixture comprising the steps of:

flowing the fluid mixture through a rigid, electrically conductive adsorbent member having an affinity for the targeted constituents, the adsorbent member further comprising an activated carbon fiber composite material consisting essentially of a multiplicity of porous carbon fibers bonded with a carbonizable organic binder to form an open, permeable structure, the composite defining a porosity in a range of approximately 82–86%;

adsorbed molecules of the targeted constituents being adsorbed on the adsorbent member; and applying a voltage to the adsorbent member, the voltage imparting a current flow which causes the adsorbed molecules of the targeted constituents to be desorbed from the adsorbent member.

2. A method according to claim 1, wherein the activated carbon fiber composite material comprises a carbon fiber composite molecular sieve.

3. A method according to claim 1, wherein the voltage is selected to achieve surface physidesorption, ohmic heating of the adsorbent member, and/or other modes of excitation of the adsorbed molecules.

4. A method according to claim 1, wherein the fluid is natural gas and the constituent is carbon dioxide.

5. A method according to claim 1, further comprising purging the adsorbent member with a purge gas while applying the voltage.

6. A method according to claim 1, wherein the fluid is natural gas and the constituent is hydrogen sulfide.

7. An apparatus for separating one or more targeted constituents from a fluid mixture comprising:

a rigid, electrically conductive adsorbent member having an affinity for molecules of the targeted constituents, the adsorbent member further comprising an activated carbon fiber composite material consisting essentially of a multiplicity of porous carbon fibers bonded with a carbonizable organic binder to form an open, permeable structure, the composite defining a porosity in a range of approximately 82–86%; and means for flowing the fluid mixture through the adsorbent member, the molecules being adsorbed on the adsorbent member; and means for applying a voltage to the adsorbent member, the voltage imparting a current flow which causes the molecules of the targeted constituents to be desorbed from the adsorbent member.

8. An apparatus according to claim 7, wherein the activated carbon fiber composite material comprises a carbon fiber composite molecular sieve.

9. An apparatus according to claim 7, wherein the adsorbent member has electrical leads from a power supply connected to opposite ends thereof.

10. An apparatus according to claim 7, wherein the fluid is natural gas and the constituent is carbon dioxide.

11. An apparatus according to claim 7, wherein the fluid is natural gas and the constituent is hydrogen sulfide.

* * * * *